US008966124B1

(12) United States Patent
Prusia

(10) Patent No.: US 8,966,124 B1
(45) Date of Patent: Feb. 24, 2015

(54) SYSTEMS, METHODS, AND ARTICLES OF MANUFACTURE TO STREAM DATA

(71) Applicant: Ronald Norman Prusia, Ridgecrest, CA (US)

(72) Inventor: Ronald Norman Prusia, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 252 days.

(21) Appl. No.: 13/627,062

(22) Filed: Sep. 26, 2012

(51) Int. Cl.
*G06F 3/00* (2006.01)
*G06F 13/42* (2006.01)
*G06F 13/00* (2006.01)
*G06F 13/14* (2006.01)
*G06F 9/26* (2006.01)

(52) U.S. Cl.
USPC .......... 710/4; 710/3; 710/9; 710/10; 710/106; 710/110; 710/305; 711/202

(58) Field of Classification Search
CPC . G06F 13/4247; G06F 13/4282; G06F 13/37; G06F 13/40; G06F 13/42; G06F 12/02; H04L 12/400006
USPC .................. 710/1, 3–4, 9–10, 106, 110, 305; 709/206; 711/202
See application file for complete search history.

(56) References Cited

U.S. PATENT DOCUMENTS

| 4,573,120 | A   | * | 2/1986  | Ichimiya et al. | 710/1   |
|-----------|-----|---|---------|-----------------|---------|
| 7,752,364 | B2  | * | 7/2010  | Oh et al.       | 710/110 |
| 7,761,633 | B2  | * | 7/2010  | Devila et al.   | 710/110 |
| 8,055,826 | B2  | * | 11/2011 | Janssen et al.  | 710/110 |
| 2004/0228429 | A1 | * | 11/2004 | Schanke et al. | 375/372 |
| 2007/0076502 | A1 | * | 4/2007  | Pyeon et al.    | 365/221 |
| 2008/0016269 | A1 | * | 1/2008  | Chow et al.     | 711/103 |
| 2011/0016278 | A1 | * | 1/2011  | Ware et al.     | 711/148 |
| 2011/0022666 | A1 | * | 1/2011  | Pinto           | 709/206 |
| 2012/0311297 | A1 | * | 12/2012 | Lee et al.      | 711/202 |

* cited by examiner

*Primary Examiner* — Farley Abad
*Assistant Examiner* — Henry Yu
(74) *Attorney, Agent, or Firm* — Christopher L. Blackburn; James M. Saunders

(57) ABSTRACT

Systems and methods for streaming data. Systems allow read/write across multiple or N device modules. Device modules on a bus ring configure at power up (during initialization process); this process informs each device module of its associated address values. Each ringed device module analyzes an address indicator word, which identifies an address at which a read/write operation is intended for, and compares the address designated by the address indicator word to its assigned addresses; when the address designated by the address indicator word is an address associated with the device module, the device module read/writes from/to the address designated by the address indicator word. Memory controller (ring controller or master bus) is not required to 'know' which memory chip/device module in a daisy chain the address command word is intended for. Therefore, system embodiments allow streaming without consideration of a number of memory chips/device modules on bus. The bus isolates modules like object oriented programming.

14 Claims, 5 Drawing Sheets

Fig. 3

|  | COL R1 | COL R2 | COL R3 | COL R4 | COL R5 | |
|---|---|---|---|---|---|---|
| ROW R1 | 0x0000 | 0x0000 | 0x0000 | 0x0000 | 0x0000 | |
| ROW R2 | 0x0003 | 0x0000 | 0x0000 | 0x0000 | 0x0000 | ADDR IN #1 & READ CYCLE |
| ROW R3 | 0x0002 | 0x0003 | 0x0000 | 0x0000 | 0x0000 | UPDATE ADDRESS #1 |
| ROW R4 | 0x0000 | 0x0002 | 0x0004 | 0x0000 | 0x0000 | UPDATE LENGTH #1, IN #2 |
| ROW R5 | 0x0000 | 0x0000 | 0x0001 | 0x0004 | 0x0000 | APPEND #1, UPDATE ADDR #2 |
| ROW R6 | 0x0000 | 0x0000 | 0x1111 | 0x0001 | 0x0005 | UPDATE LENGTH #2 TO ZERO |
| ROW R7 | 0x0000 | 0x0000 | 0x0000 | 0x1111 | 0x0000 | PASS DATA |
| ROW R8 | 0x0000 | 0x0000 | 0x0000 | 0x0000 | 0x1111 | APPEND #2 |
| ROW R9 | 0x0000 | 0x0000 | 0x0000 | 0x0000 | 0x2222 | PASS DATA |
|  |  |  |  |  | 0x0000 |  |

Fig. 4

SYSTEMS, METHODS, AND ARTICLES OF MANUFACTURE TO STREAM DATA

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to steaming digital data.

BRIEF DESCRIPTION OF THE DRAWINGS

FIG. 3 is a timing diagram of a stream of data during an example of a write process.

FIG. 4 is a timing diagram of a stream of data during an example of a read process.

Figure 1:
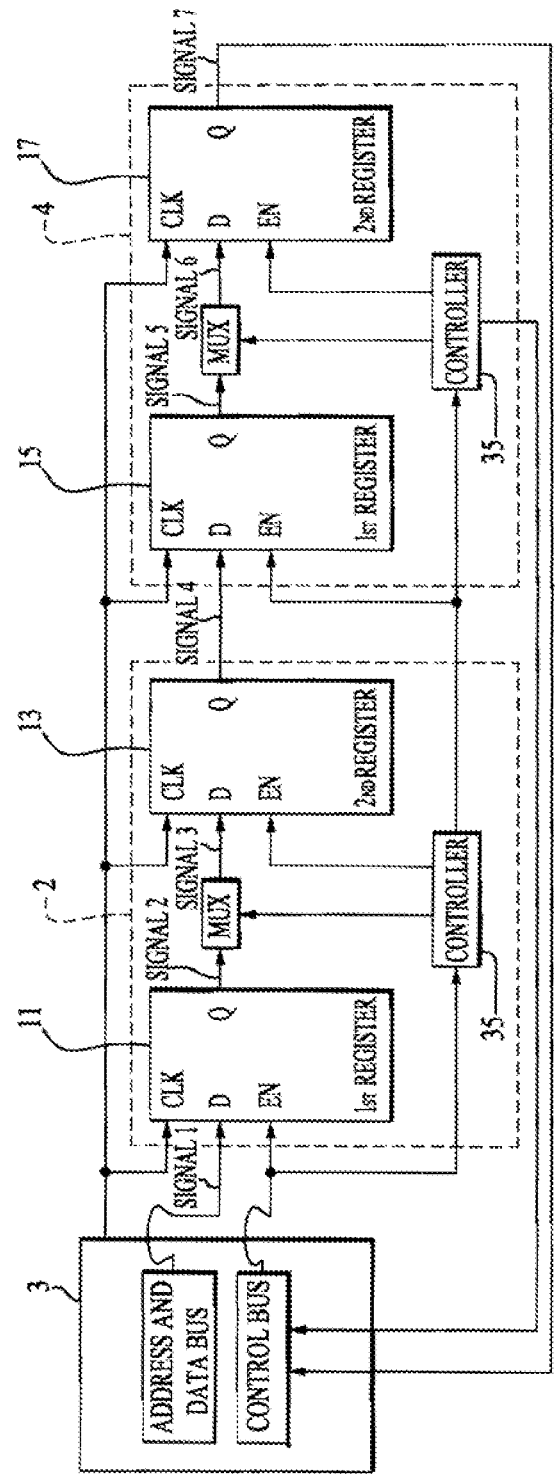
FIG. 1 is a signal diagram illustrating streaming through a stream ring formed of a ring controller, a first device module, and a second device module.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

As used herein, consistent with its usage in the art, the term 'bus' is a subsystem that transfers data between components inside a computer, or between computers. Communication links (buses) across which computers or device modules talk to one another may be either serial or parallel, and are implemented via any type of communication channel (e.g., wires, printed circuit tracks, or optical fibers). A parallel link transmits several streams of data simultaneously along multiple channels; a serial link transmits a single stream of data across the multiple channels. Buses used in embodiments of the inventions in this application are serial link/buses.

As used herein, the term 'ring controller' describes a bus master.

As used herein, the term 'data stream' means at least one word of at least one width.

As used herein, a binary address is a number that identifies the location of a word in memory. Each word stored in a memory device or system has a unique address. Addresses always exist in a digital system as a binary number, although octal, hexadecimal and hexadecimal numbers are often used to represent the address for convenience.

As used herein, a read operation is an operation performed by a device module whereby the binary word stored in a specific memory location (address) is sensed and then transferred to another device. A read operation is often called a fetch operation, since a word is being fetched from memory.

As used herein, a write operation is the operation whereby a new word is placed into a particular memory location. It is also referred to as a store operation. Whenever a new word is written into a memory location, it replaces the word that was previously stored there.

As used herein, a word is a group of bits (cells) that represents instructions or data of some type. For example, a register consisting of eight Flip Flops can be considered to be a memory that is storing an 8-bit word. Word sizes in modern computers typically range from 4 to 64 bits, depending on the size of the computer.

As used herein, consistent with its usage in the art, a device module is any electronic device module. Forms of device modules include, without limitation, hard drives, compact disks, expansion cards, memory (including RAM, DRAM, DSRAM), graphics cards, computer printers, image scanners, tape drives, microphones, loudspeakers, webcams, and digital cameras.

In digital electronics, especially computing, a hardware register stores bits of information, in a way that all the bits can be written to or read out simultaneously. The hardware registers inside a central processing unit (CPU) are called processor registers. Signals from a state machine to the register control when registers transmit to or accept information from other registers. Sometimes the state machine routes information from one register through a functional transform, such as an adder unit, and then to another register that stores the results. Typical uses of hardware registers include configuration and start-up of certain features, especially during initialization, buffer storage e.g. video memory for graphics cards, input/output (I/O) of different kinds, and status reporting such as whether a certain event has occurred in the hardware unit. Reading a hardware register in "peripheral units"—computer hardware outside the CPU—involves accessing its memory-mapped I/O address or port-mapped I/O address with a "load" or "store" instruction, issued by the processor. Hardware registers are addressed in words, but sometimes only use a few bits of the word read in to or written out to, the register. Registers are normally measured by the number of bits they can hold, for example, an "8-bit register" or a "32-bit register". Registers can be implemented in a wide variety of ways, including register files, standard SRAM, individual flip-flops, or high speed core memory.

As used herein, ring controller(s) and device modules are "hardware elements".

In electronics hardware compilation is a process by which an abstract form of desired circuit behavior is turned into a design implementation in terms of logic gates. Common examples of this process include synthesis of HDLs, including VHDL and Verilog. Some tools can generate bitstreams for programmable logic devices such as PALs or FPGAs, while others target the creation of ASICs. Logic synthesis is one aspect of electronic design automation.

Flip-flops and combinatorial logic enable the execution of LabVIEW on FPGAs. Flip-flops are synchronization elements that hold the output constant between edges of a global clock Flip-flops have a D input, an enable input, a clock input, and a Q output. The D input is transferred to the Q output on any clock edge during which the enable is asserted. The Q output of a flip-flop feeds combinatorial logic such as look-up tables, AND gates, and MUXs.

The output of some compilers may target computer hardware at a very low level, for example a Field Programmable Gate Array (FPGA) or structured Application-specific integrated circuit (ASIC). Such compilers are said to be hardware compilers or synthesis tools because the source code they compile effectively controls the final configuration of the hardware and how it operates; the output of the compilation are not instructions that are executed in sequence—only an interconnection of transistors or lookup tables. For example. XST is the Xilinx Synthesis Tool used for configuring FPGAs. Similar tools are available from Altera, Synplicity, Synopsys and other vendors.

Figure 2:
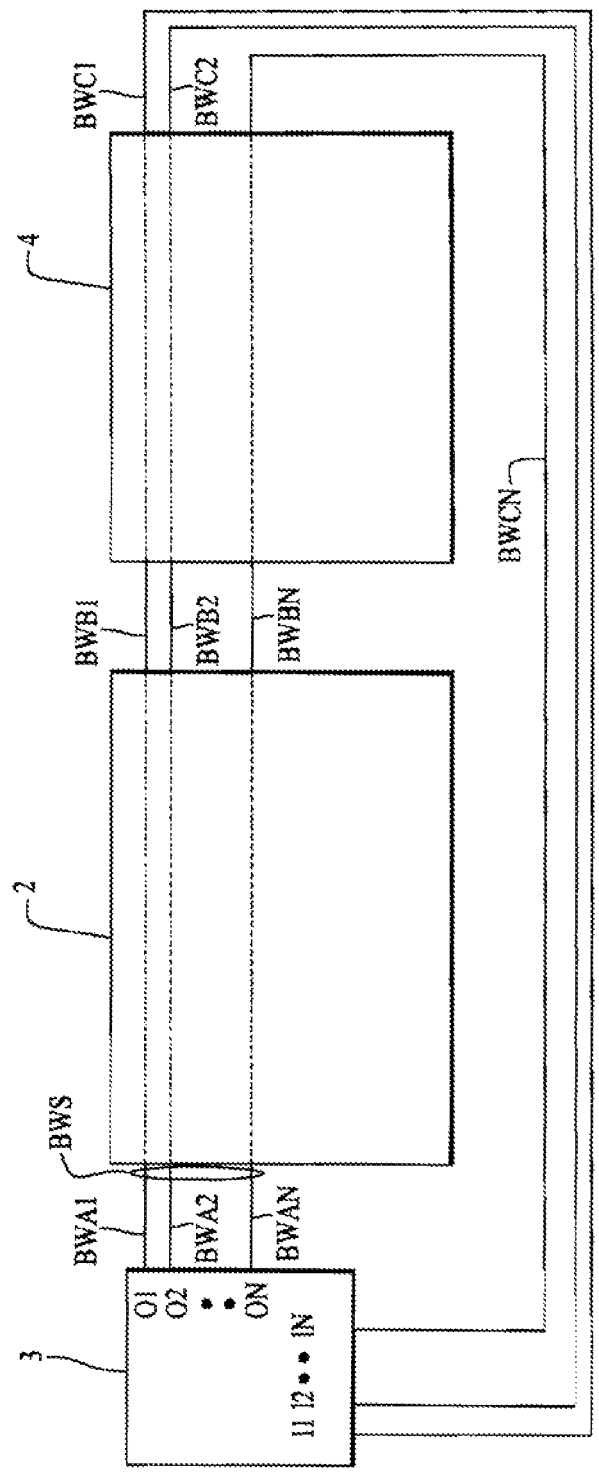
FIG. 2 is a block diagram illustrating a conceptual representation of the device modules and ring controller of an exemplary stream ring interconnected using an embodiment of uni-directional busses constructed in accordance with principles of the invention.

With reference to FIGS. 1 and 2, hardware-compiled device modules 2, 4 are compiled (using a hardware compiler) to analyze (and where appropriate, act on) the dynamic data stream, wherein each hardware-compiled device module 2, 4 analyzes the dynamic data stream output by the hardware element immediately preceding it in the stream ring, wherein a hardware element is either the ring controller 3 (which functions, and is sometimes referred to herein, as a "bus master" 3) or a device module 2, 4. Each of slave controllers 35 are local to their corresponding device modules 2, 4. The stream ring of a given operation cycle is the ring controller plus all of the device modules hardware-compiled for the given operation cycle. Once a read/write operation cycle is completed using a particular stream of data, a stream ring can be re-compiled for a different operation cycle to include add, remove, or be formed of an entirely different set of, device module(s).

The hardware compilation is performed prior to streaming the data from the ring controller 3; therefore, the number and identification of device modules through which a given operation cycle's data stream will be streamed (device modules in a given operation cycle's stream ring) during a read/write cycle is pre-determined, i.e., it is determined prior to applying any part of the data stream to input pins of any device module. In the generally illustrated representative embodiments illustrated in FIGS. 1 and 2, two device modules 2, 4 have been compiled (using a hardware compiler) to analyze the data stream (the stream ring in FIGS. 1 and 2 is formed of hardware elements consisting of ring controller, first device module, and second device module). The data is passed from the ring controller 3 to first hardware compiled device module 2, from first hardware compiled device module 2 to second hardware compiled device module 4, and from second hardware compiled device module 4 back to the ring controller 3; however, in other embodiments, a third or N hardware device modules could be compiled to populate the ring through which the dynamic data will serially flow, in which case the data will stream from ring controller 3 to first hardware compiled device module 2, from first hardware compiled device module 2 to second hardware compiled device module 4, from second hardware compiled device module 4 to the next module as compiled prior to streaming to populate the stream ring and so on through the last of the device modules compiled to populate the stream ring, and from the last of the device modules compiled to populate the stream ring back to the ring controller 3.

In embodiments of this invention, a dynamic stream of data (formed of a plurality of potentially dynamic words) is sequentially clocked through at least one device module during a read cycle or a write cycle; the dynamic stream of data includes an operation instruction word and at least one address indicator word (a destination address) indicating at least one address on which the operation instruction word instructs action to be taken.

A stream's operation instruction word is sometimes referred to as a 'read operation instruction word', a 'write operation instruction word', a 'read/write' operation instruction word', and an 'initialization operation instruction word', depending on the context. The operation instruction word includes a bit(s) that instruct the modules of a stream ring whether the current cycle is an initialization cycle, a read cycle, or a write cycle. In some embodiments, the dynamic stream of data includes a word with a bit dedicated to indicating word length. In some embodiments, the address indicator word and operation instruction word (and, where present, the length indication bit/word) are a single word; in other embodiments that include a length indication bit/word, the address and operation instruction word and (where present) length indication word are three different words or are combined into two words.

In some embodiments, for example in some read embodiments, the dynamic stream of data exhibits "dynamic" properties in that it is updated by a device module during a read cycle when a read operation is performed (the updating can occur, for example, via appending a read word to the stream and/or by updating the address indicating word and/or length indicating word). Therefore, the stream of data is referred to as a "dynamic" stream of data. Note however, than in some embodiments, the stream of data is no adapted to change during a given cycle, and in some other embodiments, though the stream of data is adapted to change in response to execution of an operation instruction during a cycle, the stream does not change because the cycle does not include execution of the operation instruction (the latter could occur for example during a read cycle when none of the hardware compiled device modules have an address that corresponds to the binary address from which the operation instruction word instructions action to a word to be read); for consistency, the streamed data is referred to as a "dynamic" stream of data even when the stream is not updated/modified during a cycle.

With reference to FIG. 2, the dynamic stream of data is applied to a hardware element 2, 3, 4 using a uni-directional bus formed of at least N wires BWS (Bus Wire Set). Each word of the dynamic data stream is formed of 'N' number of bits. i.e. each word has a word size of 'N' bits. Each bit of each word in the dynamic data stream is serially clocked/transferred along the ring using one of the N number of wires BWS (Bus Wire Set); each word in the dynamic data stream is serially clocked/transferred along the ring during an operation cycle on the same set of wires used to transfer the other word(s) in the dynamic data stream during the operation cycle. Note that in some embodiments, the Bus Wire Set includes N wires to stream the operation instruction word, the address indicator word (and streamed-word(s) or read-word(s)) plus X wire(s) to carry an "enable" (EN) signal.

Bus Systems

With reference to FIG. 2, embodiments of bus systems include a plurality of hardware compiled device modules 2, 4 and a uni-directional serial data and address bus structure BWS. The uni-directional serial data and address bus structure BWS is adapted to operably receive hardware compiled device modules 2, 4 and to serially clock dynamic words of a dynamic stream of data from a ring controller 3 through hardware compiled device modules 2, 4 without returning the dynamic words to ring controller 3 until the dynamic words have been clocked through a last of hardware compiled device modules 2, 4. The dynamic words includes at least one operation instruction word and at least one address indicator word indicating at least one binary address on which said at least one operation instruction word instructs action to be taken.

Note that in these embodiments, the first section plurality of bus wires BWA1, BWA2 . . . BWAN, the second section plurality of bus wires BWB1, BWB2 . . . BWBN, and the third section plurality of bus wires BWC1, BWC2 . . . BWCN are different sections of the same wires.

Each hardware compiled device module 2, 4 is adapted to:
analyze the at least one binary address (derived from the address indicator word clocked through the hardware compiled device module) and determine whether the at least one binary address as clocked through the hardware compiled device module is within one of a plurality of binary addresses associated with the hardware compiled device module:

append a stored word from the hardware compiled device module to the dynamic stream of data as output by the hardware compiled device module using the hardware compiled device module when the hardware compiled device module determines that the stored word's corresponding of the at least one binary address is within the plurality of binary addresses associated with the hardware compiled device module and has a corresponding of the at least one operation instruction that is a read instruction in response to determining that the stored word's corresponding of the at least one binary address is within the plurality of binary addresses associated with the hardware compiled device module and has the corresponding of the at least one operation instruction that is the read instruction; and write a streamed word from the plurality of dynamic words clocked through the hardware compiled device module to the hardware compiled device module when the hardware compiled device module determines that the streamed word's corresponding of the at least one binary address from the plurality of dynamic words clocked through the hardware compiled device module is within the plurality of binary addresses associated with the hardware compiled device module and the at least one binary address from the plurality of dynamic words clocked through the hardware compiled device module has a corresponding of the at least one operation instruction that is a write instruction in response to determining that the streamed word's corresponding of the at least one binary address is within the plurality of binary addresses associated with the hardware compiled device module and has a corresponding of the at least one operation instruction that is a write instruction; and output an output data stream, wherein, when the reading step is performed, the output data stream output by the hardware compiled device module includes the stored word.

With reference to FIGS. 1 and 2, in some embodiments, the plurality of hardware compiled device modules includes a first hardware compiled device module 2 and a second hardware compiled device module 4. With reference to FIG. 2, in these embodiments, the uni-directional serial data and address bus structure BWS includes a plurality of bus wires BWS serially interconnecting the ring controller 3, the first hardware compiled device module 2, and the second hardware compiled device module 4 in a ring. In these embodiments, the plurality of bus wires BWS includes a first section plurality of bus wires BWA1, BWA2 . . . BWAN serially interconnecting ring controller 3 to first hardware compiled device module 2. In these embodiments, the plurality of bus wires BWS includes a second section plurality of bus wires BWB1, BWB2 . . . BWBN serially interconnecting first hardware compiled device module 2 to second hardware compiled device module 4. In these embodiments, the plurality of bus wires BWS includes a third section plurality of bus wires BWC1, BWC2 . . . BWCN interconnecting second hardware compiled device module 4 to ring controller 3. In these embodiments, the uni-directional serial data and address bus structure BWS is adapted to not transfer the plurality of dynamic words to the ring controller 3 until the plurality of dynamic words has been clocked through the last of the plurality of hardware compiled device modules (in this case, second hardware compiled device module 4 is the last device module compiled to be included in the stream ring).

In some embodiments, the number of the plurality of bus wires BWS is equal to a number of bits of each of the dynamic plurality of words. In some of these embodiments, ring controller 3 is adapted to transfer operation instruction word and address indicator word from ring controller 3 to the first hardware compiled device module 2 by applying the operation instruction word and the at least one binary address word to the first section plurality of bus wires BWA1, BWA2 . . . BWAN at different clock ticks.

In some of these embodiments, first hardware compiled device module 2 is adapted to transfer the operation instruction word and the at least one dynamic binary address word a output by first hardware compiled device module 2 to second hardware compiled device module 4 by applying the operation instruction word and the at least one dynamic binary address word as output by the first hardware compiled device module 2 to second section plurality of bus wires BWB1, BWB2 . . . BWBN at different clock ticks.

In some of these embodiments, second hardware compiled device module 4 is adapted to transfer the operation instruction word and the at least one dynamic binary address word as output by the second hardware compiled device module 4 to ring controller 3 by applying the operation instruction word and the at least one dynamic binary address word as output by the second hardware compiled device module 4 to the third section plurality of bus wires BWC1, BWC2 . . . BWCN at different clock ticks.

Methods of Streaming Data i. Write Cycle Method Examples

A write cycle method includes applying an input data stream to a device module, wherein the input data stream includes at least one streamed word, at least one operation instruction word, and at least one address indicator word indicating at least one binary address at which the at least one operation instruction instructs the at least one streamed word to be written. Write cycle method embodiments further include determining whether the at least one binary address is within one of a plurality of binary addresses associated with the device module (by analyzing the address indicator word using the at least one device module). Write cycle methods further include writing the streamed word from the input data stream to the device module using the device module when the device module determines that the at least one binary address is within the plurality of binary addresses associated with the device module.

An exemplary write cycle is described with reference to FIGS. 1-3. In this example, first hardware compiled device module 2 is associated/mapped to addresses 0 to 3 and second hardware compiled device module 4 is associated/mapped with addresses 4 to 7. In this example, the operation instruction word and address indicator word are 16 bits (N=16); however, in other embodiments, the number of bits (N) is more or less than 16.

Figure 3:
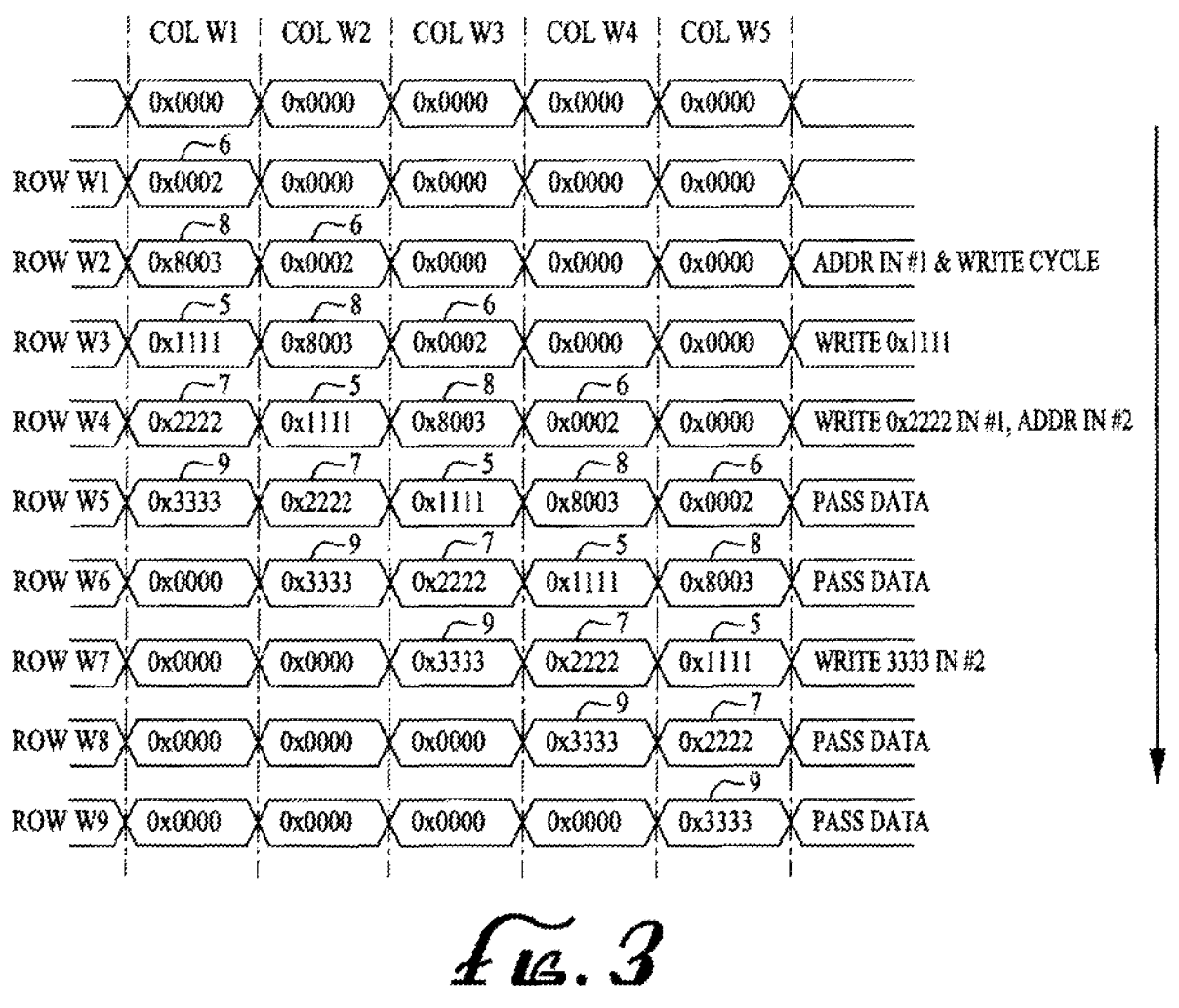

With reference to FIG. 3, the dynamic stream of data in this example includes three words 5, 7, 9 associated with an operation (write) instruction word 6; the three words 5, 7, 9 associated with the operation (write) instruction word 6 are referred to herein as "streamed" words. With reference to FIGS. 1 and 2, data is streamed through first device module 2 and sequentially provided to second device module 4.

With reference to FIGS. 2 and 3, in this example, the data stream is sequentially applied from the controller 3 to first hardware compiled device module 2 using a first section plurality of bus wires BWA1, BWA2 . . . BWAN of the plurality of bus wires BWS of the unidirectional bus, and the data stream (as updated/modified by first module 2—Signal 4) is sequentially applied from the first hardware compiled device module 2 the second hardware compiled device module 4 using a second section plurality of bus wires BWB1, BWB2 . . . BWBN of the plurality of bus wires BWS of the unidirectional bus.

With reference to FIGS. 1 and 3, each of columns 1-5 represents data flow as follows, where each row occurs at a system clock tick that occurs prior to each of the lower rows: 1) column 1 is data presented to first register 11 of first hardware compiled device module 4; 2) column 2 is data stored in first register 11 of first module 4 and presented to second register 13 of second module; 3) column 3 is data stored in second register of first hardware compiled device module 2 and presented to first register 13 of second hardware compiled device module 4; 4) column 4 is data stored in first register 15 of second hardware compiled device module 4 and presented to second register 17 of second hardware compiled device module 4; 5) column 5 is data stored in second register 17 of second hardware compiled device module 4.

With reference to FIGS. 1 and 3, in this example, at the first clock tick (row w1), the data presented to a first register 11 of first hardware compiled device module 2 is an address indicator word (hexadecimally represented as 0002 6 that is used to determine an address at which at least one streamed word (associated with a write instruction in the data stream) is to be written.

With reference to FIGS. 2 and 3, the address indicator word 0002 6 is presented to first device module 2 at first time step by applying the address indicator word to the first section plurality of bus wires BWA1, BWA2 . . . BWAN of the plurality of bus wires BWS of the unidirectional bus at the first time step. More specifically, in this example, the first bit of address indicator word 0002 6 is applied to BWA1 at the first clock tick, the second bit of address indicator word 0002 6 is applied to BWA2 at the first clock tick, the last bit of address indicator word 0002 6 (bit N) is applied to BWAN at the first clock tick, and each bit between the second bit and last bit is applied to its unique wire of the first section plurality of bus wires at the first clock tick.

With reference to FIGS. 1 and 3, at a second clock tick (row w2), address indicator word 0002 6 is stored in the first register 11 of first module 2 and operation instruction word 8003 8 is presented to first register 11 of first module 2.

With reference to FIGS. 2 and 3, operation instruction word 8003 8 is applied to first device module 2 at the second time step by applying operation instruction word 8003 8 to the first section plurality of bus wires BWA1, BWA2 . . . BWAN of the plurality of bus wires BWS of the unidirectional bus at the second time step. More specifically, in this example, the first bit of operation instruction word 8003 8 is applied to BWA1 at the second clock tick, the second bit of operation instruction word 8003 8 is applied to BWA2 at the second clock tick, the last bit of operation instruction word 8003 8 (bit N) is applied to BWAN at the second clock tick, and each bit of operation instruction word 8003 8 between the second bit and last bit is applied to its unique wire of the first section plurality of bus wires at the second clock tick. (number of words in the stream that are associated with the read/write instruction)

In the example dynamic stream depicted in FIG. 3, the word length is designated by the number 3 in operation instruction word 8003 8, which indicates that there are three words in the data stream associated with the write instruction (in this example the write instruction is designated as 8 in 8003 and the number of words in the stream that are associated with the read/write instruction is designated as 3). With reference to FIGS. 2 and 3, first device module 2 analyzes the address presented to it along with the operation instruction word 8003 8 during the second clock period and determines that first streamed word 5 (being at address 2) and second streamed word 7 (being at address 3) of the three streamed words 5, 7, 9 in the data stream associated with the write instruction are assigned addresses within the plurality of addresses associated with first module 2. Therefore, first module 2 prepares to write first streamed word 5 and second streamed word 7 in the stream to memory in first module 2. First module 2 determines that the third word 9 (which is at address 4, as determined by adding two to the address indicator 0002, which equals 4), is not within the plurality of addresses assigned to first module 2, i.e., it is not one of 0, 1, 2, or 3, so first module 2 is adapted pass third streamed word 9 through first device module 2 without writing third streamed word 9 to first device module 2.

With reference to FIGS. 1 and 3, at a third clock tick (row w3), address indicator word 0002 6 is stored in second register 13 of first module 2 and presented to first register 15 of second module 4, operation instruction word 8003 8 is stored in first register 11 of first module 2, and first streamed word 5 is presented to first register 11 in first module 2.

With reference to FIGS. 2 and 3, first streamed word 5 is presented to first device module 2 at the third time step by applying first streamed word 5 to first section plurality of bus wires BWA1, BWA2 . . . BWAN of the plurality of bus wires BWS of the unidirectional bus at the third time step. More specifically, in this example, the first bit of first streamed word 5 is applied to BWA1 at the third tick, the second bit of first streamed word 5 is applied to BWA2 at the third clock tick, the last bit of first streamed word 5 (bit N) is applied to BWAN at the third clock tick, and each bit of first streamed word 5 between the second bit and last bit is applied to its unique wire of the first section plurality of bus wires at the third clock tick.

With reference to FIGS. 2 and 3, address indicator word 0002 6 is presented to second device module 2 at the third time step by applying address indicator word 0002 6 to second section plurality of bus wires BWB1, BWB2 . . . BWBN of the plurality of bus wires BWS of the unidirectional bus at the third time step. More specifically, in this example, the first bit of address indicator word 0002 6 is applied to BWB1 at the third tick, the second bit of address indicator word 0002 6 is applied to BWB2 at the third clock tick, the last bit of address indicator word 0002 6 (bit N) is applied to BWBN at the third clock tick, and each bit of address indicator word 0002 6 between the second bit and last bit is applied to its unique wire of the first section plurality of bus wires at the third clock tick.

In this example embodiment, as the address of first streamed word 5 (which is address space 2) was determined by first module 2 to be within the addresses associated with first module 2 first streamed word 2 is written to a memory in first module 2 during the third clock period (in response to the determination that the address of first streamed word 5 is within the addresses associated with first module 2).

With reference to FIGS. 1 and 3, at a fourth clock tick (row w3), address indicator word 0002 6 is stored in first register 11 of second module 4, operation instruction word 8003 8 is stored in second register 13 of first module 2 and presented to first register 15 of second module 4, a first streamed word 5 is stored in first register 11 of first module 2, and second word 7 is presented to first register 11 in first module 2.

With reference to FIGS. 2 and 3, second streamed word 7 is applied to first device module 2 at the fourth time step by applying second streamed word 7 to the first section plurality of bus wires BWA1, BWA2 ... BWAN of the plurality of bus wires BWS of the unidirectional bus at the fourth time step. With reference to FIG. 3, second streamed word 7 is presented to first device module 2 at the fourth time step by applying second streamed word 7 to first section plurality of bus wires BWA1, BWA2 ... BWAN of the plurality of bus wires BWS of the unidirectional bus at the fourth time step. More specifically, in this example, the first bit of second streamed word 7 is applied to BWA1 at the fourth tick, the second bit of second streamed word 7 is applied to BWA2 at the fourth clock tick, the last bit of second streamed word 7 (bit N) is applied to BWAN at the fourth clock tick, and each bit of second streamed word 7 between the second bit and last bit is applied to its unique wire of the first section plurality of bus wires at the fourth clock tick.

With reference to FIGS. 2 and 3, the operation instruction word 8003 8 is applied to second device module 4 at the fourth time step by applying the operation instruction word 8003 8 to the second section plurality of bus wires BWB1, BWB2 ... BWBN of the plurality of bus wires BWS of the unidirectional bus at the fourth time step. In this example embodiment, as the address of second streamed word 7 (2+1, which is 3) is one of the addresses associated with first module 2, second streamed word 7 is written to memory in first module 2 during a fourth clock period. More specifically, in this example, the first bit of operation instruction word 8003 8 is applied to BWB1 at the fourth tick, the second bit of operation instruction word 8003 8 is applied to BWB2 at the fourth clock tick, the last bit of operation instruction word 8003 8 (bit N) is applied to BWBN at the fourth clock tick, and each bit of operation instruction word 8003 8 between the second bit and last bit is applied to its unique wire of the second section plurality of bus wires at the fourth clock tick.

During the fourth clock period, second module 4 analyzes the address 0002 6 along with the operation instruction word 8003 8 and determines that first streamed word 5 and second streamed word 7 of the three streamed words 5, 7, 9 are not associated with addresses within the plurality of address within second module 4, and third streamed word 9 (3333 is 0002+2, which is 0004) is associated with an address within the plurality of addresses within second module 4. Therefore, second module 4 prepares to pass first streamed word 5 and second streamed word 7 through second module 4 without writing first streamed word 5 and second streamed word 7 to second module 4, and write third streamed word 9 to memory in second module 4.

With reference to FIGS. 1 and 3, at a fifth clock tick (row w5), address indicator word 0002 6 is stored in second register 17 of second module 4, the operation instruction word 8003 8 is stored in first register 11 of second module 4, first streamed word 5 is stored in second register 13 in first module 2 and presented to first register 15 of second module 4, second streamed word 7 is stored in first register 11 in first module 2, and third streamed word 7 is presented to the first register 11 in first module 2.

With reference to FIGS. 2 and 3, third streamed word 9 is applied to first device module 2 at the fifth time step by applying third word 9 to the first section plurality of bus wires BWA1, BWA2 ... BWAN of the plurality of bus wires BWS of the unidirectional bus at the fifth time step. More specifically, in this example, the first bit of third streamed word 9 is applied to BWA1 at the fifth clock tick, the second bit of third streamed word 9 is applied to BWA2 at the fifth clock tick, the last bit (bit N) of second streamed word 9 is applied to BWAN at the fifth clock tick, and each bit of third streamed word 9 between the second bit and last hit is applied to a wire of the first section plurality of bus wires unused by any other bit of third streamed word 9 at the fifth clock tick.

With reference to FIGS. 2 and 3, first streamed word 5 is applied to second device module 4 at the fifth time step by applying first streamed word 5 to the second section plurality of bus wires BWB1, BWB2 ... BWBN of the plurality of bus wires BWS of the unidirectional bus at the fifth time step. More specifically, in this example, the first bit of first steamed word 5 is applied to BWB1 at the fifth clock tick, the second bit of first streamed word 5 is applied to BWB2 at the fifth clock tick, the last bit (bit N) of first streamed word 5 is applied to BWBN at the fifth clock tick, and each bit of first streamed word 5 between the second bit and last bit is applied to a wire of the second section plurality of bus wires unused by any other bit of first streamed word 5 at the fifth clock tick.

With reference to FIGS. 1 and 3, at a sixth clock tick (row w6), address indicator word 0002 6 is returned to the ring controller 3 (because no other device module remains to be streamed through—the address indicator word has been streamed through all device modules compiled in the ring), operation instruction word 8003) 8 is stored in second register 17 of second module 4, first streamed word 5 is stored in first register 11 in second module 4, second streamed word 7 is stored in second register 13 in first module 2 and presented to first register 15 of second module 4, and third streamed word 9 is stored in first register 11 of first module 2. As the address of first streamed word 5 is not one of the addresses associated with second module 4, data is passed without writing first streamed word 5 to second module 4.

With reference to FIG. 3, in this example embodiment, no word is applied to the first section plurality of bus wires BWA1, BWA2 ... BWAN of the plurality of bus wires BWS of the unidirectional bus at the sixth time step.

With reference to FIGS. 2 and 3, the second streamed word 7 is applied to second device module 4 at the sixth time step by applying the second word 7 to the second section plurality of bus wires BWB1, BWB2 ... BWBN of the plurality of bus wires BWS of the unidirectional bus at the sixth time step. More specifically, in this example, the first bit of second streamed word 7 is applied to BWB1 at the sixth clock tick, the second bit of second streamed word 7 is applied to BWB2 at the sixth clock tick, the last bit of second streamed word 7 (bit N) is applied to BWBN at the sixth clock tick, and each bit of second streamed word 7 between the second bit and last bit is applied to a wire of the second section plurality of bus wires unused by any other bit of second streamed word 7 at the sixth clock tick.

With reference to FIGS. 2 and 3, the address indicator word 0002 6 is returned to ring controller 3 at the sixth time step by applying the address indicator word 0002 6 to the third section plurality of bus wires BWC1, BWC2 ... BWCN of the plurality of bus wires BWS of the unidirectional bus at the sixth time step. More specifically, in this example, the first bit of address indicator word 0002 6 is applied to BWC1 at the sixth tick, the second bit of address indicator word 0002 6 is applied to BWC2 at the sixth clock tick, the last bit of address indicator word 0002 6 (bit N) is applied to BWCN at the sixth clock tick, and each bit of address indicator word 0002 6 between the second bit and last bit is applied to its unique wire of the third section plurality of bus wires at the sixth clock tick.

With reference to FIGS. 1 and 3, at a seventh clock tick (row w7), operation instruction word 8003 8 is returned to the ring controller 3 (because no other device module remains to be streamed through—the address indicator word has been streamed through all device modules compiled in the ring), first streamed word 5 is stored in second register 17 in second module 4, second streamed word 7 is stored in first second register 4 in second module 4, and third streamed word 9 is stored in second register 13 of first module 2 and presented to first register 15 of second module 4. As address of third streamed word 9 is one of the addresses associated with second module 4, third streamed word 9 is written to memory in second module 4.

With reference to FIGS. 2 and 3, operation instruction word 8003 8 is returned to the ring controller 3 at the seventh time step by applying the operation instruction word 8003 8 to the third section plurality of bus wires BWC1, BWC2 . . . BWCN of the plurality of bus wires BWS of the unidirectional bus at the seventh time step. More specifically, in this example, the first bit of operation instruction word 8003 8 is applied to BWC1 at the seventh clock tick, the second bit of operation instruction word 8003 8 is applied to BWC2 at the seventh clock tick, the last bit of operation instruction word 8003 8 (bit N) is applied to BWCN at the seventh clock tick, and each bit of operation instruction word 8003 8 between the second bit and last bit is applied to a wire of the third section plurality of bus wires unused by any other bit of operation instruction word 8003 8 at the seventh clock tick.

With reference to FIGS. 2 and 3, third streamed word 9 is applied to second device module 4 at the seventh time step by applying the third streamed word 9 to the second section plurality of bus wires BWB1, BWB2 . . . BWBN of the plurality of bus wires BWS of the unidirectional bus at the seventh time step. More specifically, in this example, the first bit of third streamed word 9 is applied to BWB1 at the seventh tick, the second bit of third streamed word 9 is applied to BWB2 at the seventh clock tick, the last bit of third streamed word 9 (bit N) is applied to BWBN at the seventh clock tick, and each bit of third streamed word 9 between the second bit and last bit is applied to a wire of the third section plurality of bus wires unused by any other bit of third streamed wood 9 at the seventh clock tick.

The remainder of the data stream is passed though second device module 4, where it is returned to controller 3 using the third section plurality of bus wires BWC1, BWC2 . . . BWCN of the plurality of bus wires BWS of the unidirectional bus as described above.

ii. Read Cycle Method Examples

A read cycle method includes applying an input data stream to a device module, wherein the input data stream includes at least one read instruction, and at least one address indicator word indicating at least one binary address from which the at least one read instruction instructs the at least one streamed word to be written. Read cycle embodiments further include determining whether the at least one binary address is within one of a plurality of binary addresses associated with the device module. Read cycle embodiments further include reading the stored word from the device module using the device module when the device module determines that the at least one binary address is within the plurality of binary addresses associated with the device module. Read cycle embodiments further include outputting an output data stream from the device module, wherein, when the reading step is performed, the output data stream is formed of the input data stream appended to include the stored word.

An exemplary read cycle is described with reference to FIGS. 1, 2 and 4. In this example, first module 2 is associated/mapped to addresses 1 to 3 and second module 4 is associated/mapped with addresses 4 to 7. The stream of data in this example includes an address indicator word 19, a read/write instruction and length indicator word (indicating the number of words associated with the read instruction that have yet to be read) 21. Data is streamed through first device module 2 and output, wherein it is then provided to second device module 4. With reference to FIG. 4, in this example, the data stream is sequentially applied from the controller 3 to first hardware compiled device module 2 using a first section plurality of bus wires BWA1, BWA2 . . . BWAN of the plurality of bus wires BWS of the unidirectional bus, and the data stream (as updated/modified by first module 2—Signal 4) is sequentially applied from the first hardware compiled device module 2 the second hardware compiled device module 4 using a second section plurality of bus wires BWB1, BWB2 . . . BWBN of the plurality of bus wires BWS of the unidirectional bus.

With reference to FIG. 4, each of columns 1-5 represents data flow as follows, where each row occurs at a system clock tick that occurs prior to each of the lower rows: 1) column 1 is data presented to first register 11 of first module 2; 2) column 2 is data stored in first second register 4 of first module 4 and presented to second register 13 of first module 2; 3) column 3 is data stored in second register 13 of first module 2 and presented to first register 15 of second module 4; 4) column 4 is data stored in first register 15 of second module 4 and presented to second register 4 of second module 4; 5) column 5 is data stored in second register 4 of column 2.

With reference to FIGS. 1 and 4, in this example, at the first clock tick (row r1), the data presented to a first register 11 of first module 2 is address indicator word 0003 19 that is used to determine an address to be analyzed, and, if determined to be within the then current module, read from.

With reference to FIGS. 2 and 4, address indicator word 0003 19 is presented to first device module 2 at first time step by applying address indicator word 0003 19 to the first section plurality of bus wires BWA1, BWA2 . . . BWAN of the plurality of bus wires BWS of the unidirectional bus at the first time step. More specifically, in this example, the first bit of address indicator word 0003 19 is applied to BWA1 at the first clock tick, the second bit of address indicator word 0003 19 is applied to BWA2 at the first clock tick, the last bit of address indicator word 0003 19 (bit N) is applied to BWAN at the first clock tick, and each bit of address indicator word 0003 19 between the second bit and last bit is applied to a wire of the first section plurality of bus wires unused by any other bit of address indicator word 0003 19 during the first clock period.

With reference to FIGS. 1 and 4, in this example, at a second clock tick (row r2), the address indicator word 0003 19 is stored in the first register 11 of first module 2 and an operation instruction word 0002 21 is presented to first register 11 of first module 2: the word length is designated by the number 2 in the operation instruction word 0002 21, which indicates that there are two words associated with the read instruction that have yet to be appended to the data stream. The read instruction is designated by the upper bit 0 in operation instruction word 0002 21. First register 11 of first module 2 analyzes the address indicator word 0003 19, along with the operation instruction word 0002 21 presented to it, and determines that address 3 is one of the plurality of addresses associated with first module 2. Therefore, first module 2 prepares to read (append) a word stored at address 3 within memory in first module 2 onto the data stream.

With reference to FIGS. 2 and 4, operation instruction word 0002 21 is presented to first device module 2 at the second time step by applying the address indicator word to the first section plurality of bus wires BWA1, BWA2 . . . BWAN of the plurality of bus wires BWS of the unidirectional bus at the second time step. More specifically, in this example, the first bit of operation instruction word 0002 21 is applied to BWA1 at the first clock tick, the second bit of operation instruction word 0002 21 is applied to BWA2 at the second clock tick, the last bit of operation instruction word 0002 21 (bit N) is applied to BWAN at the second dock tick, and each bit of operation instruction word 0002 21 between the second bit and last bit is applied to a wire of the first section plurality of bus wires unused by any other bit of operation instruction word 0002 21 during the second clock period.

With reference to FIGS. 1 and 4, in this example, during a third clock period (row r3), as the read word at address space 3 has already been assigned to be read onto the data stream, the address indicator word acted on by first register 11 of first module 2 is incremented (by the number of words read from the module since the last increment) to another binary address (in this case 4, derived from adding 1 to the address 3) and stored in second register 13 of first module 2 and presented to first register 15 of second device module 4; the operation instruction word 0002 21 is stored in first register 11 of first module 2.

With reference to FIGS. 2 and 4, address indicator word 0004 19 is presented to second device module 4 at the third clock tick by applying the address indicator word 0004 19 to the second section plurality of bus wires BWB1, BWB2 . . . BWBN of the plurality of bus wires BWS of the unidirectional bus at the second time step. More specifically, in this example, the first bit of address indicator word 0004 19 is applied to BWB1 at the third clock tick, the second bit of address indicator word 0004 19 is applied to BWB2 at the third clock tick, the last bit of address indicator word 0004 19 (bit N) is applied to BWBN at the third clock tick, and each bit of address indicator word 0004 19 between the second bit and last bit is applied to a wire of the second section plurality of bus wires unused by any other bit of address indicator word 0004 19 during the third clock period.

With reference to FIGS. 1 and 4, in this example, at a fourth clock tick (row r4), address indicator word 0004 19 is stored in first register 15 of second module 4, and an updated operation instruction word 0001 21 is stored in second register 13 of first module 2 and presented to first register 15 of second device module 4 (Signal 4). In this example embodiment, as the word at address 0003 has already been assigned to be read onto the data stream, the word length indicator was decremented (by the number of words read by the module since the last decrement) from 0002 to 0001, which indicates that a word assigned to an address has yet to be determined to be within one of the device modules 2, 4.

With reference to FIGS. 2 and 4, the updated operation instruction word 0001 21 is presented to first register 15 of second device module 4 at the fourth time step by applying operation instruction word 0001 21 to the second section plurality of bus wires BWB1, BWB2 . . . BWBN of the plurality of bus wires BWS of the unidirectional bus at the fourth time step. More specifically, in this example, the first bit of operation instruction word 0001 21 is applied to BWB1 at the fourth clock tick, the second bit of operation instruction word 0001 21 is applied to BWB2 at the fourth clock tick, the last bit of operation instruction word 0001 21 (bit N) is applied to BWBN at the fourth clock tick, and each bit of operation instruction word 0001 21 between the second bit and last bit is applied to a wire of the second section plurality of bus wires unused by any other bit of updated operation instruction word 0001 21 during the fourth clock period.

During the fourth clock period, second module 4 analyzes address indicator word 0004 19 and determines that address 4 is one of the plurality of addresses associated with second module 4. Therefore, second module 4 prepares to read (append) a word stored within second module 4 at address 4 onto the data stream.

With reference to FIGS. 1 and 4, in this example, at a fifth clock tick (row r5), first read word 23 within second module 4 at address space 4 is appended to the data stream, address indicator word is incremented to 0005 and stored in second register 17 of second module 4, and operation instruction word 0001 21 is stored in first register 15 of second module 4.

With reference to FIGS. 1 and 4, in this example, at a sixth clock tick (row r6), address indicator word 0005 19 is returned to ring controller 3, operation instruction word 21 is decremented to 0000 and stored in second register 17 of second module 4, and first read word 1111 23 is stored in first register 15 of second module 4. Note that even though address 5 is within the set of addresses assigned to second module 4, second module 4 does not read the word because the read word length is now zero, which indicates that no more words remain to be read.

With reference to FIGS. 2 and 4, address indicator word 0005 19 is passed on to ring controller 3 by applying address indicator word 0005 19 to the third section plurality of bus wires BWC1, BWC2 . . . BWCN of the plurality of bus wires BWS of the unidirectional bus. Mote specifically, in this example, the first bit of address indicator word 0005 19 is applied to BWC1 at the sixth clock tick, the second bit of address indicator word 0005 19 is applied to BWC2 at the sixth clock tick, the last bit of address indicator word 0005 19 (bit N) is applied to BWCN at the sixth clock tick, and each bit of address indicator word 0005 19 between the second bit and last bit is applied to a wire of the third section plurality of bus wires unused by any other bit of address indicator word 0005 19 during the sixth clock period.

With reference to FIGS. 1 and 4, in this example, at a seventh clock tick, operation instruction word 0000 21 is returned to ring controller 3 and first read word 1111 23 is stored in second register 17 in second module 4. Data is merely passed during this clock period.

With reference to FIGS. 2 and 4, operation instruction word 0000 21 is returned to ring controller 3, by application of operation instruction word 0000 21 (by second device module) to the third section plurality of bus wires BWC1, BWC2 . . . BWCN of the plurality of bus wires BWS of the unidirectional bus. More specifically, at a seventh clock tick, the first bit of operation instruction word 0000 21 is applied to BWC1 at the seventh clock tick, the second bit of operation instruction word 0000 21 is applied to BWC2 at the seventh clock tick, the last bit of operation instruction word 0000 21 (bit N) is applied to BWCN at the seventh clock tick, and each bit of operation instruction word 0000 21 between the second bit and last bit is applied to a wire of the third section plurality of bus wires unused by any other bit of operation instruction word 0000 21 during the seventh clock period.

With reference to FIGS. 1 and 4, in this example, at an eighth clock tick, first read word 23 returned to the ring controller 3, and second read word 25 is stored in second register 17 in second module 4.

With reference to FIGS. 2 and 4, first read word 23 is passed on to ring controller 3 by application of the first read word 23 (by second device module) to the third section plurality of bus wires BWC1, BWC2 . . . BWCN of the plurality of bus wires BWS of the unidirectional bus. More specifically, at an eighth clock tick, the first bit of first read word 23 is applied to BWC1 at the eighth clock tick, the second bit of first read word 23 is applied to BWC2 at the eighth clock tick, the last bit of first read word (bit N) is applied to BWCN at the eighth clock tick, and each bit of first read word 23 between the second bit and last bit is applied to a wire of the third section plurality of bus wires unused by any other bit of first read word 23 during the eighth clock period.

iii. Initialization Cycle Method Examples

With reference to FIG. 1, an initialization cycle method includes streaming a initialization cycle dynamic data stream through the hardware-compiled device modules in a stream ring. This includes applying initialization cycle dynamic data stream to the hardware compiled device module 2, wherein the initialization cycle dynamic data stream includes at least one initialization operation instruction word and at least one initialization address indicator word. Each hardware compiled device module 2, 4 knows its length prior to streaming the initialization cycle dynamic data stream during the initialization cycle. Initialization cycle embodiments further include memory mapping a set of addresses to the hardware compiled device modules 2, 4, wherein the set of addresses mapped to a given hardware compiled device module is determined using the length of the hardware-compiled-device module in combination with a reference address derived from the initialization address indicator word presented to the hardware-compiled-device module.

An exemplary initialization cycle is described with reference to FIGS. 1, 4, and 5. In this example, all device modules 2, 4 compiled in the stream ring are initially assigned an address of zero (0). In the example in FIGS. 1 and 5, hardware device modules 2 and 4 are the only hardware compiled device modules in the stream ring. However, in other embodiments, move or less hardware device modules are compiled in a ring. In embodiments in which Y (where Y>2) hardware compiled device modules are compiled in the ring, the BWS wires would be serially interconnected through the all Y of the hardware compiled device modules; the BWS wires would not interconnect any of the hardware device modules (except for the Y hardware compiled device module) to the ring controller (except through other hardware compiled device modules) and only interconnect to a single other hardware device module.

The initialization cycle dynamic data stream in this example includes initialization address indicator word 27 and initialization operation instruction word 29. With reference to FIG. 4, in this example, the data stream is sequentially applied from controller 3 to first hardware compiled device module 2 (Signal 1) using a first section plurality of bus wires BWA1, BWA2 . . . BWAN of the plurality of bus wires BWS of the unidirectional bus, and the data stream as updated/modified by first module 2 (first-module-processed initialization cycle dynamic data stream—Signal 4) is sequentially applied from first hardware compiled device module 2 to second hardware compiled device module 4 using a second section plurality of bus wires BWB1, BWB2 . . . BWBN of the plurality of bus wires BWS of the unidirectional bus.

Figure 5:
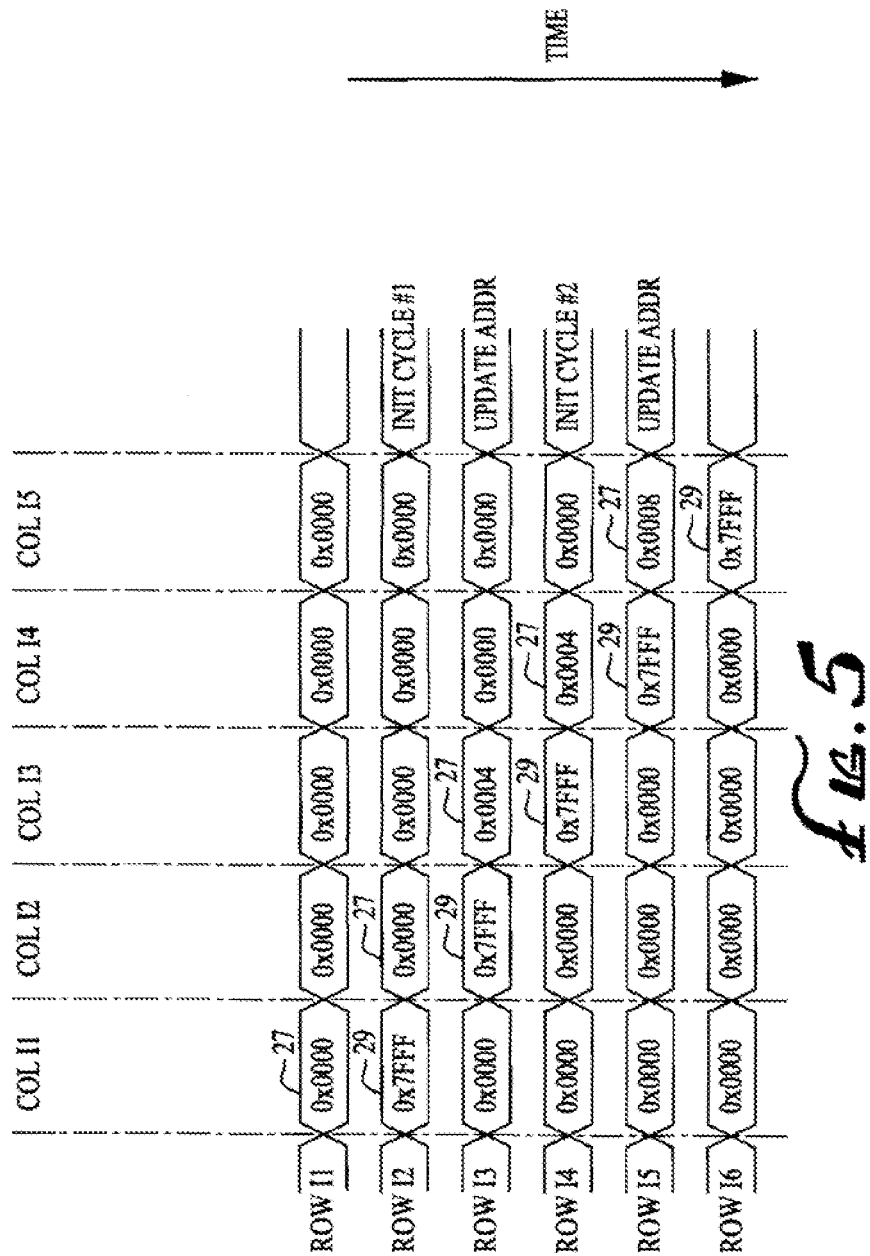
FIG. 5 is a timing diagram of a stream of data during an example of an initialization process.

With reference to FIG. 5, each of columns 1-5 represents data flow as follows, where each row occurs at a system clock tick that occurs prior to each of the lower rows: 1) column 1 is data presented to first register 11 of fast module 2; 2) column 2 is data stored in first register 11 of first module 2 and presented to second register 4 of first module 2; 3) column 3 is data stored in second register 4 of first module 2 and presented to first register 15 of second module 4; 4) column 4 is data stored in first register 15 of second module 4 and presented to second register 4 of second module 4; 5) column 5 is data stored in second register 4 of column 2.

With reference to FIGS. 1 and 5, in this example, at the second clock tick (Row I2), initialization operation instruction word 7FFF 29 is presented to a first register 11 of first module 4, and first form of the initialization address indicator word 0000 27 is stored in the first register 11 of first module 2.

With reference to FIG. 4, initial form of the initialization address indicator word 0000 27 is applied to first device module 2 at second time step by applying initial form of the initialization address indicator word 0000 27 to the first section plurality of bus wires BWA1, BWA2 . . . BWAN of the plurality of bus wires BWS of the unidirectional bus at the second time step.

During the second dock period, as mentioned above, a reference address is derived from initial form of the initialization address indicator word 0000 27; in this example, the reference address (which is 0) is the address hexademically represented by the initial form of the initialization address indicator word 0000 27. In this example, as the length of first hardware module 2 is four, first device module prepares to map four addresses (beginning at the reference address 0)—0, 1, 2, and 3—to first hardware compiled device module 2.

During the second clock period, first hardware compiled device module increments initial form of the initialization address indicator word (0000) 27 so that the reference address hexadecimally represented by the incremented address indicator word 0004 27 in Row I3 is not an address within the addresses mapped to the hardware device module doing the incrementing (or any of the preceding hardware device modules)—in this case first hardware device module 2—thereby generating a first-module-processed initialization address indicator word 0004 27. In this example, first hardware device module increments the initial form of the initialization address indicator word to a value equal to the highest address assigned to the first hardware device module plus one—3+1=4; therefore, as illustrated in Row I3, the first-module-processed form of the initialization address indicator word stored by first register 11 (Signal 2) of first module 2 and input into second register 13 (Signals 3) of first module 2 is 0004 27 in Row I3.

In this example, at the third clock tick, initialization operation instruction word (7FFF) 29 is stored in a first register 11 of first module 2, and first-module-processed form of the initialization address indicator word 0004 27 in Row I3 is stored in the second register 13 of first module 2 and presented to first register 15 of second hardware compiled device module 4.

With reference to FIG. 4, first-module-processed form of the address indicator word 0004 27 in Row I3 is applied to second device module 4 at third time step by applying first-module-processed form of the initialization address indicator word 0004 27 in Row I3 to the second section plurality of bus wires BWB1, BWB2 . . . BWBN of the plurality of bus wires BWS of the unidirectional bus at the third time step. During the third clock period, as determined during the second clock period, addresses 0, 1, 2, and 3 are mapped to first hardware compiled device module 2.

In this example, at the fourth clock tick, initialization operation instruction word (7FFF) 29 is stored in a second register 13 of first module 2 and presented to first register 15 of second hardware compiled device module 4, and first-module-processed form of the initialization address indicator word 0004 27 in Row I4 is stored in first register 15 of second module 2. With reference to FIG. 4, operation instruction word 7FFF 29 is applied to second device module 4 at fourth time step by applying initialization operation instruction word (7FFF) 29 to the second section plurality of bus wires BWB1, BWB2 . . . BWBN of the plurality of bus wires BWS of the unidirectional bus at the first fourth step.

During the fourth clock period, a reference address is derived from the first-module-processed form of the initialization address indicator word 0004 27 in Row I4; in this example, the reference address (4) is the address hexademically represented by the first-module-processed form of the initialization address indicator word 0004 27 in Row I4 and the reference address is the first address mapped to second hardware device module 4. In this example, as the length of second hardware compiled device module 4 is four, second device module 4 prepares to map four addresses—4, 5, 6, and 7 to second device module 4.

During the fifth clock period, second hardware compiled device module 4 increments the first-module-processed form of the initialization address indicator word 0004 27 in Row I4 so that the address indicator word reference address hexadecimally represented by the incremented address indicator word 0008 27 in Row I5 is not an address within the addresses mapped to the hardware device module doing the incrementing (or any of the preceding hardware device modules)—in this case second hardware device module 4 (doing the incrementing) and first hardware device module 2 (the preceding hardware device modules), thereby generating second-module-processed form of the initialization address indicator word 0008 27. In this example, second hardware device module 4 increments the first-module-processed form of the initialization address indicator word it was presented 0004 27 in Row I4 to a value equal to the highest address assigned to the second hardware device module plus one—7+1=8; therefore, as illustrated in Row I5, the second-module process form of the address indicator word 0008 27 in Row I5 stored in second register 17 of second hardware device module 4 is 0008. During the fifth clock period, as determined during the fourth clock period, addresses 4, 5, 6, and 7 are mapped to second hardware compiled device module 4, second-module-processed form of the initialization As no more hardware compiled device modules were compiled as part of the stream ring, second-module-processed form of the initialization address indicator word 0008 27 in Row I5 is passed to the ring controller 3 at a sixth clock tick by applying the second-module-processed form of the initialization address indicator word 0008 27 to the third section plurality of bus wires BWC1, BWC2 . . . BWCN of the plurality of bus wires BWS of the unidirectional bus at the sixth time step. The same process is performed for the address initializing indicator word 7FF at a sixth time step.

Note that some embodiments include performing an initialization cycle on the hardware compiled device modules and then performing a read/write cycle on the hardware compiled device modules.

iv. Methods that Include Distinguishing Between Read/Write Data/Operations

With reference to FIG. 1, these embodiments includes serially streaming a read/write cycle dynamic data stream through the hardware-compiled device modules in a stream ring, wherein the read/write cycle dynamic data stream includes an operation instruction word and an address indicator word.

These methods include applying an initial form of the a read/write cycle dynamic data stream to a device module 2, wherein the initial form of the a read/write cycle dynamic data stream includes at least one initial form of the operation instruction word and at least one initial form of the address indicator word indicating at least one address on which the at least one initial form of the operation instruction word instructs action to be taken.

These embodiments further include determining whether the at least one address is within one of a plurality of binary addresses associated/mapped with the device module.

These embodiments include reading a stored word associated with the at least one binary address from the device module using the device module when the device module determines that the at least one binary address is within the plurality of binary addresses associated with the device module and has a corresponding of the at least one initial form of a read/write operation instruction word that includes a read instruction in response to determining that the at least one binary address is within the plurality of binary addresses and has the corresponding of the at least one initial form of a read/write operation instruction word that includes the read instruction.

These embodiments further include writing a streamed word associated with the at least one binary address from the data stream to the device module using the device module when the device module determines that the at least one binary address is within the plurality of binary addresses and has a corresponding of the at least one initial form of a read/write operation instruction word that includes a write instruction in response to determining that the at least one binary address is within the plurality of addresses and has a corresponding of the at least one initial form of a read/write operation instruction word that includes a write instruction.

These embodiments further include outputting a device-module-processed form of the read/write cycle dynamic data stream from the device module, wherein, when the reading step is performed, the device-module-processed form of the read/write cycle dynamic data stream includes the stored word.

A method embodiment for performing a method using at least two device modules, wherein the method includes distinguishing between read and write data, and performing the appropriate read/write operation in response to determining that the operation instruction is associated with an address within a plurality of addresses associated with a device module as indicated in the data stream is described with reference to FIGS. 1 and 2.

These embodiments include streaming a read/write cycle dynamic data stream formed of a plurality of dynamic words from a ring controller to a first device module of a plurality of hardware-compiled device modules 2, 4 arranged in a daisy chain topology with first device module 2, from first device module 2 to a second device module 4 of plurality of hardware-compiled device modules 2, 4, and from second device module 4 to ring controller 3. The plurality of dynamic words includes a read/write operation instruction word 8, 21 and a read/write address indicator word 6, 19. First device module 2 is mapped to a first plurality of addresses and second device module 4 is mapped to a second plurality of addresses. The streaming the read/write cycle dynamic data stream from ring controller 3 to first device module 2, from first device module 2 to second device module 4, and from second device module 4 to ring controller 3 step is performed by:

streaming an initial form of the read/write cycle dynamic data stream (Signal 1) from ring controller 3 to the first of a plurality of registers within first device module 2, wherein the initial form of the read/write cycle dynamic data stream includes an initial form of the read/write operation instruction word 8003 8, 0002 21 and an initial form of the read/write address indicator word 0002 6, 0003 19 indicating at least one initial read/write binary address (initial read/write binary address is 2 as shown in FIG. 3 and 3 as shown in FIG. 4) on which the initial form of the read/write operation instruction word 8003 8, 0002 21 instructs action to be taken;

determining whether each of the at least one initial read/write binary address is within the first plurality of addresses using the plurality of registers within the first device module, and when it is determined that the at least one initial read/write binary address is within the first plurality of addresses associated with the first device module 2:

reading a word stored in the first device module 2 at the at least one initial read/write binary address when the initial form of the read/write operation instruction word 8003 8, 0002 21 instructs a read action to be taken at the at least one initial read/write binary address;

writing a stream-word from the initial form of the read/write cycle dynamic data stream (Signal 1) to the first device module 2 when the initial form of the read/write operation instruction word 8003 8, 0002 21 instructs a write action to be taken at the at least one initial read/write binary address;

when it is determined that the at least one initial read/write binary address is not within the first plurality of addresses associated with the first device module 2;

not acting on the initial form of the read/write operation instruction word 8003 8, 0002 21 using first device module (not reading or writing the word associated with the binary address determined not to be within the plurality of addresses associated with first device module 2);

outputting a first-module-processed form of the read/write cycle dynamic data stream (Signal 4) from first device module 2, wherein the first-module-processed form of read/write cycle dynamic data stream includes the read-word 1111 23 when the read-word 1111 23 is read using first device module 2, and wherein the first-module-processed form of the read/write cycle dynamic data stream (Signal 4) includes a first-module-processed form of the read/write operation instruction word 8003 8, 0001 21 and a first-module-processed form of the read/write address indicator word 0002 6, 0004 19 (which is potentially updated by device module 2—and is why the output address indicator word is referred to herein sometimes as output data stream address indicator word) indicating a first-module-processed read/write binary address on which the first-module-processed read/write operation instruction word 8003 8, 0001 21 instructs action to be taken. As the binary address indicated by the output data stream address indicator word may be a different binary address that was indicated by the input data stream, the binary address indicated by the output data stream address indicator word is referred to herein as output data stream binary address.

streaming the first-module-processed form of the read/write cycle dynamic data stream (Signal 4) from first device module 2 to second device module 4, wherein second device module 4 has a second plurality of addresses mapped therewith:

determining whether each of the at least one first-module-processed read/write binary address is within the second plurality of addresses using the plurality of registers within the second device module 4, and when it is determined that the at least one first-module-processed read/write binary address is within the second plurality of addresses:

reading a word stored in second device module 4 at the at least one first-module-processed read/write binary address when the first-module-processed form of the read/write operation instruction word 8003 8, 0001 21 instructs a read action to be taken at the at least one first-module-processed read/write binary address;

writing a stream-word from read/write cycle dynamic data stream to second device module 4 when the first-module-processed read/write operation instruction word 8003 8, 0001 21 instructs a write action to be taken at the at least one first-module-processed read/write binary address:

when it is determined that the at least one first-module-processed read/write binary address is not within the second plurality of addresses:

not acting on the at least one first-module-processed operation instruction word 8003 8, 0001 21 using second device module 4;

outputting a second-module-processed form of the read/write cycle dynamic data stream (Signal 7) from second device module 4, wherein second-module-processed form of the read/write cycle dynamic data stream (Signal 7) includes the read-word stored in the second device module 4 when the read-word stored in the second device module is read using the second device module 4, and a second-module-processed form of the read/write operation instruction word and a second-module-processed form of the read/write address indicator word.

With reference to FIG. 4, the initial form of the read/write cycle dynamic data stream (Signal 1) is applied to first device module 2 by applying each word in the initial form of the read/write cycle dynamic data stream (Signal 1) to the first section plurality of bus wires BWA1, BWA2 . . . BWAN of the plurality of bus wires BWS of the unidirectional bus; each word of the initial form of the read/write cycle dynamic data stream (Signal 1) is applied to the bus at a different clock tick than the rest of the words in the initial form of the read/write cycle dynamic data stream (Signal 1).

The first-module-processed form of the read/write cycle dynamic data stream (Signal 4) is streamed to second device module 4 by applying each word in the first-module-processed form of the read/write cycle dynamic data stream (Signal 4) to the second section plurality of bus wires BWB1, BWB2 . . . BWBN of the plurality of bus wires BWS of the unidirectional bus: each word of the first-module-processed form of the read/write cycle dynamic data stream (Signal 4) is applied to the bus at different clock tick than the rest of the words in the first-module-processed form of the read/write cycle dynamic data stream (Signal 4).

As only two device modules were hardware-compiled as part of the stream ring prior to the read/write cycle, these embodiments further include streaming second-module-processed form of the read/write cycle dynamic data stream (Signal 7) from second device module 4 to ring controller 3.

In embodiment in which second device module 4 is not the last device module in the plurality of device modules that were hardware-compiled as part of the stream ring prior to the read/write cycle (the plurality of hardware-compiled device modules includes a remaining device module of the plurality of hardware-compiled device modules through which the read/write cycle dynamic data stream has not passed during the read/write cycle), consistent with principles of the invention, second-module-processed form of the read/write cycle dynamic data stream is not streamed from second device module 4 to ring controller 3; it is streamed from second device module 4 to the remaining device module (not illustrated) and (as processed by the remaining device module) from the remaining device module to ring controller 3.

v. Initialization and Read/Write Operation

An embodiment of a method that includes performing an initialization cycle and distinguishing between read and write data/operations, and performing the appropriate read/write operation in response to determining that the operation instruction is associated with an address within a plurality of addresses associated with a device module as indicated in the data stream is described with reference to FIGS. 2, 3, 4 and 5; these embodiments are described with reference to a two module stream ring, but one, or more than two hardware compiled modules, can be used according to principles of the invention.

With reference to FIGS. 2 and 5, these methods include initializing the device modules in a stream ring by:

streaming a first plurality of dynamic words of an initialization cycle dynamic data stream from a ring controller 3 to a first device module 2 of a plurality of device modules arranged in a daisy chain topology with first device module 2, from the first device module 2 to a second device module 4, and from second device module 4 to ring controller 3 (wherein the first plurality of dynamic words includes an initialization instruction word 29 and an initialization address indicator word 27), by:

streaming an initial form of the initialization address indicator word 0000 27 and the initialization instruction word 29 from ring controller 3 to first device module 2;

determining a first device module reference address from initial form of the initialization address indicator word 0000 27 streamed from ring controller 3 to first device module 2;

memory mapping a first plurality of binary addresses to first device module 2, wherein a number of the plurality of binary addresses mapped to first device module 2 is equal to a number of a plurality of address spaces of first device module 2 as known to first device module 2 when the first plurality of dynamic words of the initialization cycle was streamed to the first device module 2:

generating a first module processed form of the initialization address indicator word 0004 27 by updating the initial form of the initialization address indicator word 0000 27 using first device module 2;

streaming the first module processed form of the initialization address indicator word 0004 27 and initialization instruction word 29 to second device module 4;

memory mapping a second plurality of binary addresses to second device module 4, wherein a number of second plurality of binary addresses mapped to second device module 4 is equal to a number of a plurality of address spaces of second device module 4 as known to second device module 4 when the second plurality of dynamic words of the initialization cycle was streamed to second device module 4.

With reference to FIGS. 1-4, these embodiments further include streaming a read/write cycle dynamic data stream formed of a second plurality of dynamic words from ring controller 3 to first device module 2, from first device module 2 to second device module 4, and from second device module 4 to ring controller 3. The second plurality of dynamic words includes a read/write operation instruction word 8, 21 and a read/write address indicator word 6, 19. First device module 2 is mapped to the first plurality of addresses and second device module 4 is mapped to the second plurality of addresses. The streaming the read/write cycle dynamic data stream from ring controller 3 to first device module 2, from first device module 2 to second device module 4, and from second device module 4 to ring controller 3 step is performed by:

streaming an initial form of the read/write cycle dynamic data stream (Signal 1) from ring controller 3 to the first of a plurality of registers within first device module 2, wherein the initial form of the read/write cycle dynamic data stream includes an initial form of the read/write operation instruction word 8003 8, 0002 21 and an initial form of the read/write address indicator word 0002 6, 0003 19 indicating at least one initial read/write binary address (initial read/write binary address is 2 as shown in FIG. 3 and 3 as shown in FIG. 4) on which the initial form of the read/write operation instruction word 8003 8, 0002 21 instructs action to be taken;

determining whether each of the at least one initial read/write binary address is within the first plurality of addresses using the plurality of registers within the first device module, and when it is determined that the at least one initial read/write binary address is within the first plurality of addresses associated with the first device module 2:

reading a word stored in the first device module 2 at the at least one initial read/write binary address when the initial form of the read/write operation instruction word 8003 8, 0002 21 instructs a read action to be taken at the at least one initial read/write binary address;

writing a stream-word from the initial form of the read/write cycle dynamic data stream (Signal 1) to the first device module 2 when the initial form of the read/write operation instruction word 8003 8, 0002 21 instructs a write action to be taken at the at least one initial read/write binary address;

when it is determined that the at least one initial read/write binary address is not within the first plurality of addresses associated with the first device module 2:

not acting on the initial form of the read/write operation instruction word 8003 8, 0002 21 using first device module (not reading or writing the word associated with the binary address determined not to be within the plurality of addresses associated with first device module 2):

outputting a first-module-processed form of the read/write cycle dynamic data stream (Signal 4) from first device module 2, wherein the first-module-processed form of read/write cycle dynamic data stream includes the read-word 1111 23 when the read-word 1111 23 is read using first device module 2, and wherein the first-module-processed form of the read/write cycle dynamic data stream (Signal 4) includes a first-module-processed form of the read/write operation instruction word 8003 8, 0001 21 and a first-module-processed form of the read/write address indicator word 0002 6, 0004 19 (which is potentially updated by device module 2—and is why the output address indicator word is referred to herein sometimes as output data stream address indicator word) indicating a first-module-processed read/write binary address on which the first-module-processed read/write operation instruction word 8003 8, 0001 21 instructs action to be taken. As the binary address indicated by the output data stream address indicator word may be a different binary address that was indicated by the input data stream, the binary address indicated by the output data stream address indicator word is referred to herein as output data stream binary address.

streaming the first-module-processed form of the read/write cycle dynamic data stream (Signal 4) from first device module 2 to second device module 4, wherein second device module 4 has a second plurality of addresses mapped therewith;

determining whether each of the at least one first-module-processed read/write binary address is within the second plurality of addresses using the plurality of registers within the second device module 4, and when it is determined that the at least one first-module-processed read/write binary address is within the second plurality of addresses:

reading a word stored in second device module 4 at the at least one first-module-processed read/write binary address when the first-module-processed form of the read/write operation instruction word 8003 8, 0001 21 instructs a read action to be taken at the at least one first-module-processed read/write binary address;

writing a stream-word from read/write cycle dynamic data stream to second device module 4 when the first-module-processed read/write operation instruction word 8003 8, 0001 21 instructs a write action to be taken at the at least one first-module-processed read/write binary address;

when it is determined that the at least one first-module-processed read/write binary address is not within the second plurality of addresses:

not acting on the at least one first-module-processed operation instruction word 8003 8, 0001 21 using second device module 4;

outputting a second-module-processed form of the read/write cycle dynamic data stream (Signal 7) from second device module 4, wherein second-module-processed form of the read/write cycle dynamic data stream (Signal 7) includes the read-word stored in the second device module 4 when the read-word stored in the second device module is read using the second device module 4, and a second-module-processed form of the read/write operation instruction word and a second-module-processed form of the read/write address indicator word.

With reference to FIGS. 2 and 5, in these embodiments, the steaming a plurality of dynamic words of an initialization cycle dynamic data stream step, comprises applying first device module initialization address indicator word (0000) 27 to a first section BWA1, BWA2 ... BWAN of a plurality of wires BWS of a uni-directional bus connecting ring controller 3 and first device module 2 during a first initialization cycle time step and applying initialization instruction word 29 to the first section BWA1, BWA2 ... BWAN of plurality of wires BWS of the uni-directional bus connecting ring controller 3 and first device module 2 during a second initialization cycle time step.

With reference to FIGS. 2-4, in these embodiments, the streaming the initial form of the read/write cycle dynamic data stream step comprises, applying the initial form of read/write address indicator word 0002 6, 0003 19 to the first section BWA1, BWA2 ... BWAN of plurality of wires BWS of the uni-directional bus connecting ring controller 3 and first device module 2 during a first read/write cycle time step, and applying the initial form of read/write operation instruction word 8003 8, 0002 21 to first section BWA1, BWA2 ... BWAN of the plurality of wires BWS of the uni-directional bus connecting ring controller 3 and the first device module 2 during a second read/write cycle time step.

In these embodiments, the streaming the first-module-processed form of the read/write cycle dynamic data stream step comprises applying the first-module-processed form of the read/write address indicator word 0002 6, 0004 19 to a second section BWB1, BWB2 ... BWBN of the plurality of wires of the uni-directional bus connecting the first device module 2 and the second device module 4 during a third read/write cycle time step, and applying first-module-processed form of the read/write operation instruction word 8003 8, 0001 21 to second section BWB1, BWB2 ... BWBN of the plurality of wires BWS of the uni-directional bus connecting first device module 2 and the second device module 4 during a fourth read/write cycle time step.

In some of these embodiments, first-module-processed form of the read/write address indicator word 0002 6, 0004 19 is generated by incrementing the initial form of the read/write address indicator word 0002 6, 0003 19 an amount equal to a number of read-words read by the first module 2 onto the read/write cycle dynamic data stream during a then-current read/write cycle.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of streaming data, comprising:

streaming a read/write cycle dynamic data stream formed by serially clocking a plurality of dynamic words from a ring controller to a first device module of a plurality of hardware-compiled device modules arranged in a daisy chain topology with said first device module, from said first device module to a second device module of said plurality of hardware-compiled device modules, and from said second device module to said ring controller, each of said first device module and said second device module having a plurality of registers, each of said plurality of registers having a first register and a second register, wherein each of said first and said second registers having a dedicated clock, said dedicated clock in each of said first and said second registers of said plurality of registers providing a two-clock delay in each of said first device module and said second device module of said plurality of hardware-compiled device modules, wherein at initialization, said plurality of hardware-compiled device modules are configured and assigned an associated address value, said ring controller having no a priori knowledge of said associated address value;

wherein said plurality of dynamic words includes a read/write operation instruction word and a read/write address indicator word, wherein said first device module is mapped to a first plurality of addresses and said second device module is mapped to a second plurality of addresses, wherein said streaming said read/write cycle dynamic data stream is performed by:

streaming an initial form of said read/write cycle dynamic data stream from said ring controller to said first of a plurality of registers within said first device module, wherein said initial form of said read/write cycle dynamic data stream includes an initial form of said read/write operation instruction word and an initial form of said read/write address indicator word indicating at least one initial read/write binary address on which said initial form of said read/write operation instruction word instructs action to be taken;

determining whether each of said at least one initial read/write binary address is within said first plurality of addresses using said plurality of registers within said first device module, and when it is determined that said at least one initial read/write binary address is within said first plurality of addresses associated with said first device module:

reading a word stored in said first device module at said at least one initial read/write binary address onto said read/write cycle dynamic data stream when said initial form of said read/write operation instruction word instructs a read action to be taken at said initial read/write binary address;

writing a stream-word from said initial form of said read/write cycle dynamic data stream to said first device module when said initial form of said read/write operation instruction word instructs a write action to be taken at said at least one initial read/write binary address;

when it is determined that said at least one initial read/write binary address is not within said first plurality of addresses associated with said first device module:

not acting on said at least one initial form of said read/write operation instruction word using said first device module;

outputting a first-module-processed form of said read/write cycle dynamic data stream from said first device module, wherein said first-module-processed form of said read/write cycle dynamic data stream includes said read-word when said read-word is read using said first device module, and wherein said first-module-processed form of said read/write cycle dynamic data stream includes a first-module-processed form of said read/write operation instruction word and a first-module-processed form of said read/write address indicator word indicating a first-module-processed read/write binary address on which said first-module-processed form of said read/write operation instruction word instructs action to be taken;

streaming said first-module-processed form of said read/write cycle dynamic data stream from said first device module to said second device module;

determining whether each of said first-module-processed read/write binary address is within said second plurality of addresses using said plurality of registers within said second device module, and when it is determined that said first-module-processed read/write binary address is within said second plurality of addresses:

reading a word stored in said second device module at said first-module-processed read/write binary address when said first-module-processed form of said read/write operation instruction word instructs a read action to be taken at said first-module-processed read/write binary address;

writing a stream-word from said first-module-processed form of said read/write cycle dynamic data stream to said second device module when said first-module-processed form of said read/write operation instruction word instructs a write action to be taken at said first-module-processed read/write binary address;

when it is determined that said first-module-processed read/write binary address is not within said second plurality of addresses:

not acting on said first-module-processed form of said read/write operation instruction word using said second device module;

outputting a second-module-processed form of said read/write cycle dynamic data stream from said second device module, wherein said second-module-processed form of said read/write cycle dynamic data stream includes said read-word read from said second device module when said read-word stored in said second device module is read using said second device module.

2. The method of claim 1, wherein said second-module-processed form of said read/write cycle dynamic data stream includes a second-module-processed form of said read/write operation instruction word and a second-module-processed form of said read/write address indicator word, and said streaming said read/write cycle dynamic data stream step comprises:

streaming said second-module-processed form of said dynamic read/write address word from said second device module to said ring controller when said plurality of hardware-compiled device modules includes only said first device module and said second device module; and not streaming said second-module-processed form of said dynamic read/write address word from said second device module to said ring controller when said plurality of hardware-compiled device modules includes a remaining device module of said plurality of hardware-compiled device modules through which said read/write cycle dynamic data stream has not passed during said read/write cycle.

3. The method of claim 2, wherein said read/write cycle dynamic data stream is not streamed from said first device module to said ring controller.

4. The method of claim 3, wherein said streaming an initial form of said read/write cycle dynamic data stream from said ring controller to said first of a plurality of registers within said first device module step, comprises applying said initial form of said read/write address indicator word to a first section of a plurality of wires of a uni-directional bus connecting said controller and said first device module during a first time step, applying said initial form of said read/write operation instruction word to said first section of said plurality of wires of said uni-directional bus connecting said controller and said first device module during a second time step, and applying said at least one streamed word to said first section of said plurality of wires of said uni-directional bus connecting said controller and said first device module during a third time step.

5. The method of claim 4, wherein said streaming said first-module-processed form of said read/write cycle dynamic data stream from said first device module to said second device module step, comprises applying said first-module-processed form of said read/write address indicator word onto a second section of said plurality of wires of said uni-directional bus connecting said first device module and said second device module during a first time step, applying said first-module-processed read/write instruction indicating word to said second section of said plurality of wires of said uni-directional bus connecting said first device module and said second device module during a second time step, wherein said plurality of dynamic words are not conducted to said ring controller until said plurality of dynamic words has been clocked through a last of said plurality of hardware-compiled device modules.

6. A method of streaming data, comprising:
applying a plurality of dynamic words of an initialization cycle dynamic data stream by serially clocking from a ring controller to a device module, wherein said plurality of dynamic words includes an initialization operation instruction word and an initialization address indicator word said device module having a first register and a second register, each of said first and said second registers having a dedicated clock, said dedicated clock in each of said first and said second registers providing a two-clock delay in said device module, wherein at initialization, said device module is configured and assigned an associated address value, said ring controller having no a priori knowledge of said associated address value:
determining a reference address from said initialization address indicator word;
memory mapping a plurality of binary addresses to said device module, wherein a number of said plurality of binary addresses mapped to said device module is equal to a number of a plurality of address spaces of said device module as known to said device module when said plurality of dynamic words of said initialization cycle was applied to said device module;
applying a read/write cycle dynamic data stream to a device module, wherein said read/write cycle dynamic data stream includes at least one read/write operation instruction word and at least one read/write address indicator word indicating at least one binary address on which said at least one read/write operation instruction instructs action to be taken;
determining whether said at least one binary address is within one of said plurality of binary addresses;
reading a stored word associated with said at least one binary address from said device module using said device module when said device module determines that said at least one binary address is within said plurality of binary addresses associated with said device module and has a corresponding of said at least one read/write operation instruction word that is a read instruction, in response to determining that said at least one binary address is within said plurality of binary addresses associated with said device module and has said corresponding of said at least one read/write operation instruction word that is said read instruction;
writing a streamed word associated with said at least one binary address from said data stream to said device module using said device module when said device module determines that said at least one binary address is within said plurality of binary addresses associated with said device module and has a corresponding of said at least one read/write operation instruction word that is a write instruction in response to determining that said at least one binary address is within said plurality of binary addresses associated with said device module and has a corresponding of said at least one read/write operation instruction that is a write instruction; and
outputting a device module processed form of said read/write cycle dynamic data stream from said device module, wherein, when said reading step is performed, said device module processed form of said read/write cycle dynamic data stream includes said stored word.

7. The method of claim 6, wherein said reference address is said initialization address indicator word's binary number.

8. The method of claim 7, wherein said plurality of binary addresses mapped to said device module is a consecutively numbered of said plurality of address spaces beginning with said initialization address indicator word's binary number.

9. A method of streaming data, comprising:
initializing a first device module and second device module by:
streaming a first plurality of dynamic words of an initialization cycle dynamic data stream by serially clocking from a ring controller to a first device module of a plurality of device modules arranged in a daisy chain topology with said first device module, from said first device module to said second device module, and from said second device module to said ring controller, wherein said each of said first and second device modules having a first register and a second register, each of said first and second registers having a dedicated clock, said dedicated clock in each of said first and second registers providing a two-clock delay in each of said first and second device modules, wherein at initialization, said plurality of device modules are configured and assigned an associated address value, said ring controller having no a priori knowledge of said associated address value;
wherein said first plurality of dynamic words includes an initialization operation instruction word and an initialization address indicator word, by:
streaming said initialization operation instruction word and an initial form of said initialization address indicator word from said ring controller to said first device module;
determining a first device module reference address from said initial form of said initialization address indicator word streamed from said ring controller to said first device module using said first module;
memory mapping a first plurality of binary addresses to said first device module, wherein a number of said plurality of binary addresses mapped to said first device module is equal to a number of a plurality of address spaces of said first device module as known to said first device module when said first plurality of dynamic words was streamed to said first device module;
generating a first-module-processed form of said initialization address indicator word by updating said initial form of said initialization address indicator word using said first device module;
applying said first-module-processed form of said initialization address indicator word and said initialization instruction word to said second device module;
memory mapping a second plurality of binary addresses to said second device module, wherein a number of said second plurality of binary addresses mapped to said second device module is equal to a number of a plurality of address spaces of said second device module as known to said second device module when said first plurality of dynamic words was streamed to said second device module;
streaming a read/write cycle dynamic data stream formed of a second plurality of dynamic words from said ring controller to said first device module, from said first device module to said second device module, and from said second device module to said ring controller, wherein said second plurality of dynamic words includes a read/write operation instruction word and a read/write address indicator word, by:
streaming an initial form of said read/write cycle dynamic data stream from a ring controller to a first of a plurality of registers within said first device module, wherein said initial form of said read/write cycle dynamic data stream includes an initial form of said read/write operation instruction word and at least one initial form of said read/write address indicator word indicating at least one initial read/write binary address on which said at least one initial form of said read/write operation instruction word instructs action to be taken;

determining whether each of said at least one initial read/write binary address is within said first plurality of addresses using said plurality of registers within said first device module, and when it is determined that said at least one initial read/write binary address is within said first plurality of addresses associated with said first device module:

reading a word stored in said first device module at said at least one initial read/write binary address onto said read/write cycle dynamic data stream when said initial form of said read/write operation instruction word instructs a read action to be taken at said initial read/write binary address;

writing a stream-word from said initial form of said read/write cycle dynamic data stream to said first device module when said initial form of said read/write operation instruction word instructs a write action to be taken at said at least one initial read/write binary address;

when it is determined that said at least one initial read/write binary address is not within said first plurality of addresses associated with said first device module:

not acting on said at least one initial form of said read/write operation instruction word associated with said at least one initial read/write binary address using said first device module;

outputting a first-module-processed form of said read/write cycle dynamic data stream from said first device module, wherein said first-module-processed form of said read/write cycle dynamic data stream includes said read-word when said read-word is read using said first device module, and wherein said first-module-processed form of said read/write cycle dynamic data stream includes a first-module-processed form of said read/write operation instruction word and a first-module-processed form of said read/write address indicator word indicating a first-module-processed read/write binary address on which said first-module-processed form of said read/write operation instruction word instructs action to be taken;

streaming said first-module-processed form of said read/write cycle dynamic data stream from said first device module to said second device module;

determining whether each of said first-module-processed read/write binary address is within said second plurality of addresses using said plurality of registers within said second device module, and when it is determined that said first-module-processed read/write binary address is within said second plurality of addresses:

reading a word stored in said second device module at said first-module-processed read/write binary address when said first-module-processed form of said read/write operation instruction word instructs a read action to be taken at said first-module-processed read/write binary address;

writing a stream-word from said first-module-processed form of said read/write cycle dynamic data stream to said second device module when said first-module-processed form of said read/write operation instruction word instructs a write action to be taken at said first-module-processed read/write binary address;

when it is determined that said first-module-processed read/write binary address is not within said second plurality of addresses:

not acting on said first-module-processed read/write operation instruction word using said second device module; and outputting a second-module-processed form of said read/write cycle dynamic data stream from said second device module, wherein said second-module-processed form of said read/write cycle dynamic data stream includes said read-word read from said second device module when said read-word stored in said second device module is read using said second device module.

10. The method of claim 9, wherein streaming a plurality of dynamic words of an initialization cycle dynamic data stream step, comprises applying said first device module initialization address indicator word to a first section of a plurality of wires of a uni-directional bus connecting said ring controller and said first device module during a first initialization cycle time step and applying said initialization instruction word to said first section of said plurality of wires of said uni-directional bus connecting said ring controller and said first device module during a second initialization cycle time step.

11. The method of claim 10, wherein said streaming said initial form of said read/write cycle dynamic data stream step comprises, applying said initial form of said read/write address indicator word to said first section of said plurality of wires of said uni-directional bus connecting said ring controller and said first device module during a first read/write cycle time step, and applying said initial form of said read/write operation instruction word to said first section of said plurality of wires of said uni-directional bus connecting said ring controller and said first device module during a second read/write cycle time step.

12. The method of claim 11, wherein said streaming said first-module-processed form of said read/write cycle dynamic data stream step comprises applying said first-module-processed form of said read/write address indicator word to a second section of said plurality of wires of said uni-directional bus connecting said first device module and said second device module during a third read/write cycle time step, and applying said first-module-processed form of said read/write operation instruction word to said second section of said plurality of wires of said uni-directional bus connecting said first device module and said second device module during a fourth read/write cycle time step.

13. The method of claim 12, wherein said first-module-processed form of said read/write address indicator word is generated by incrementing said initial form of said read/write address indicator word an amount equal to a number of read-words read by said first module onto said read/write cycle dynamic data stream during a then-current read/write cycle.

14. The method of claim 13, wherein said first-module-processed form of said read/write address indicator word is generated by incrementing said initial form of said read/write address indicator word an amount equal to a number of read-words read by said first module onto said read/write cycle dynamic data stream during a then-current read/write cycle.

* * * * *